(12) United States Patent
Kim et al.

(10) Patent No.: US 7,605,879 B2
(45) Date of Patent: Oct. 20, 2009

(54) BACKLIGHT UNIT AND LIQUID CRYSTAL DISPLAY DEVICE USING THE SAME

(75) Inventors: Gi Bin Kim, Anyang-si (KR); Tae Woo Kim, Osan-si (KR)

(73) Assignee: LG Display Co., Ltd., Seoul (KR)

( * ) Notice: Subject to any disclaimer, the term of this patent is extended or adjusted under 35 U.S.C. 154(b) by 481 days.

(21) Appl. No.: 11/476,640

(22) Filed: Jun. 29, 2006

(65) Prior Publication Data

US 2007/0002208 A1  Jan. 4, 2007

(30) Foreign Application Priority Data

Jun. 30, 2005   (KR)   ........................ 10-2005-0058854

(51) Int. Cl.
   *H02F 1/1333*   (2006.01)
(52) U.S. Cl. ........................................ 349/58
(58) Field of Classification Search ............. 349/58–60
   See application file for complete search history.

(56) References Cited

U.S. PATENT DOCUMENTS 7,090,213 B2 *   8/2006   Suzuki et al. ............. 270/58.11
7,268,776 B2 *   9/2007   Kim et al. ................... 345/206

* cited by examiner

*Primary Examiner*—Kevin S Wood
(74) *Attorney, Agent, or Firm*—McKenna Long & Aldridge LLP (57) ABSTRACT

A backlight unit that for preventing an optical sheet from moving freely and preventing deterioration of picture quality caused by deformation. The backlight unit of a liquid crystal display device includes a light source; a reflecting sheet disposed in a rear surface of the light source; an optical sheet to direct light emitted from the light source to travel in a direction towards a liquid crystal display panel; and a cover bottom assembly formed to house the light source, the reflection sheet and the optical sheet. The cover bottom assembly comprises support side bottoms formed at two short sides of the cover bottom assembly to dispose the optical sheet thereon, and the support side bottom includes a joining part to fix the optical sheet to the support side bottom using a movable body movable on a surface of the optical sheet.

20 Claims, 8 Drawing Sheets

BACKLIGHT UNIT AND LIQUID CRYSTAL DISPLAY DEVICE USING THE SAME

This application claims the benefit of Korean Patent Application No. P2005-0058854, filed on Jun. 30, 2005, which is hereby incorporated by reference for all purposes as if fully set forth herein.

BACKGROUND OF THE INVENTION

1. Field of the Invention

The present invention relates to a liquid crystal display device, and more particularly to a backlight unit for preventing abrasion of a surface of an optical sheet.

2. Discussion of the Related Art

A liquid crystal display device (hereinafter, referred to as 'LCD') is a flat panel display device that displays a picture by controlling the transmittance of light according to a video signal. Because LCDs are light in weight, thin, and have low power consumption, LCDs are used in an increasing number of applications. LCDs are used as the display devices for equipment such as notebook computers and office automation equipment. The LCD is being actively developed to produce displays having larger screens, higher resolutions, and lower power consumption to meet the demands of users.

Figure 1:
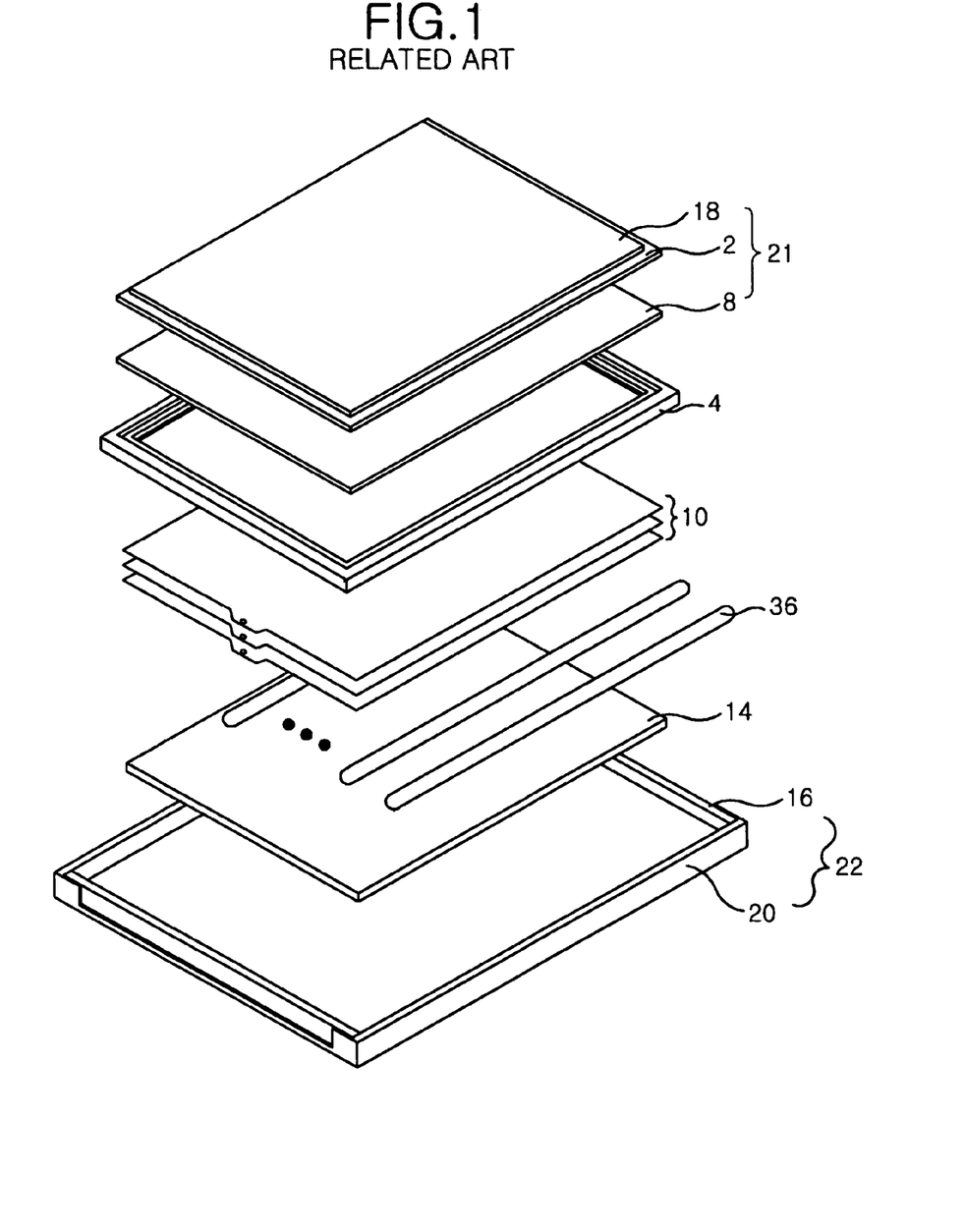
FIG. 1 is a diagram schematically illustrating a liquid crystal display device of the related art.

FIG. 1 is a diagram representing a module of a direct type liquid crystal display device of the related art.

Referring to FIG. 1, the liquid crystal display module of the related art includes a board assembly 21 having a liquid crystal display panel 2 and polarizing sheets 8, 18 formed on front and rear surfaces of the liquid crystal display panel 2; a backlight unit that receives power from an external power source to irradiate light to the liquid crystal display panel 2; and a guide panel 4 installed between the liquid crystal display panel 2 and the backlight unit to support the liquid crystal display panel 2 and to be joined with the side surface of a support side bottom 16.

The liquid crystal display panel 2 has liquid crystal cells arranged in a matrix between upper and lower glass substrates. A thin film transistor (hereinafter, referred to as 'TFT') is included at each liquid crystal cell for switching a data signal in each of the liquid crystal cells. A refractive index of each liquid crystal cell is changed in accordance with a data signal, to thereby display a picture corresponding to the data signal. A tape carrier package (TCP) is attached onto the lower substrate of the liquid crystal display panel 2. A driver integrated circuit is mounted on the TCP to apply a drive signal to the thin film transistors. Further, the polarizing sheets 8 and 18 are respectively installed on the front and rear surfaces of the liquid crystal display panel 2. The polarizing sheets 8 and 18 function to improve a viewing angle for images displayed by the liquid crystal cells.

The backlight unit is formed at a lower part of the panel, and includes a plurality of light sources 36 receiving power from an external power source to emit light; a reflection sheet 14 disposed near the rear surface of the light source 36; a plurality of optical sheets 10 for increasing the portion of the light emitted by the light source 36 to illuminate the liquid crystal display panel 2; a cover bottom assembly 22 of a quadrangular shape which houses the light source, the reflection sheet, and other components.

The light source 36 includes a high voltage electrode and a low voltage electrode formed at respective ends of a glass tube; a high voltage wire soldered to the high voltage electrode; and a low voltage wire soldered to the low voltage electrode. Herein, the electrodes are encompassed by a holder of an insulating material.

The optical sheets 10 act to evenly disperse the light from the surface of the optical sheet 10 and to direct the travel path of the light towards the front of the liquid crystal display panel 2.

The inner side surface of an edge of the guide panel 4 is formed to safely receive the liquid crystal display panel 2, and a side wall of the guide panel guides the side surface of the liquid crystal display panel 2.

The cover bottom assembly 22 includes a cover bottom 20 where side wall surfaces are formed in two long sides thereof; and a supporter side bottom 16 where inclined side wall surfaces are formed in two short sides thereof. Accordingly, the cover bottom assembly 22 has side walls formed in the four sides to hold the liquid crystal display panel 2 and the optical sheets.

Figure 2A:
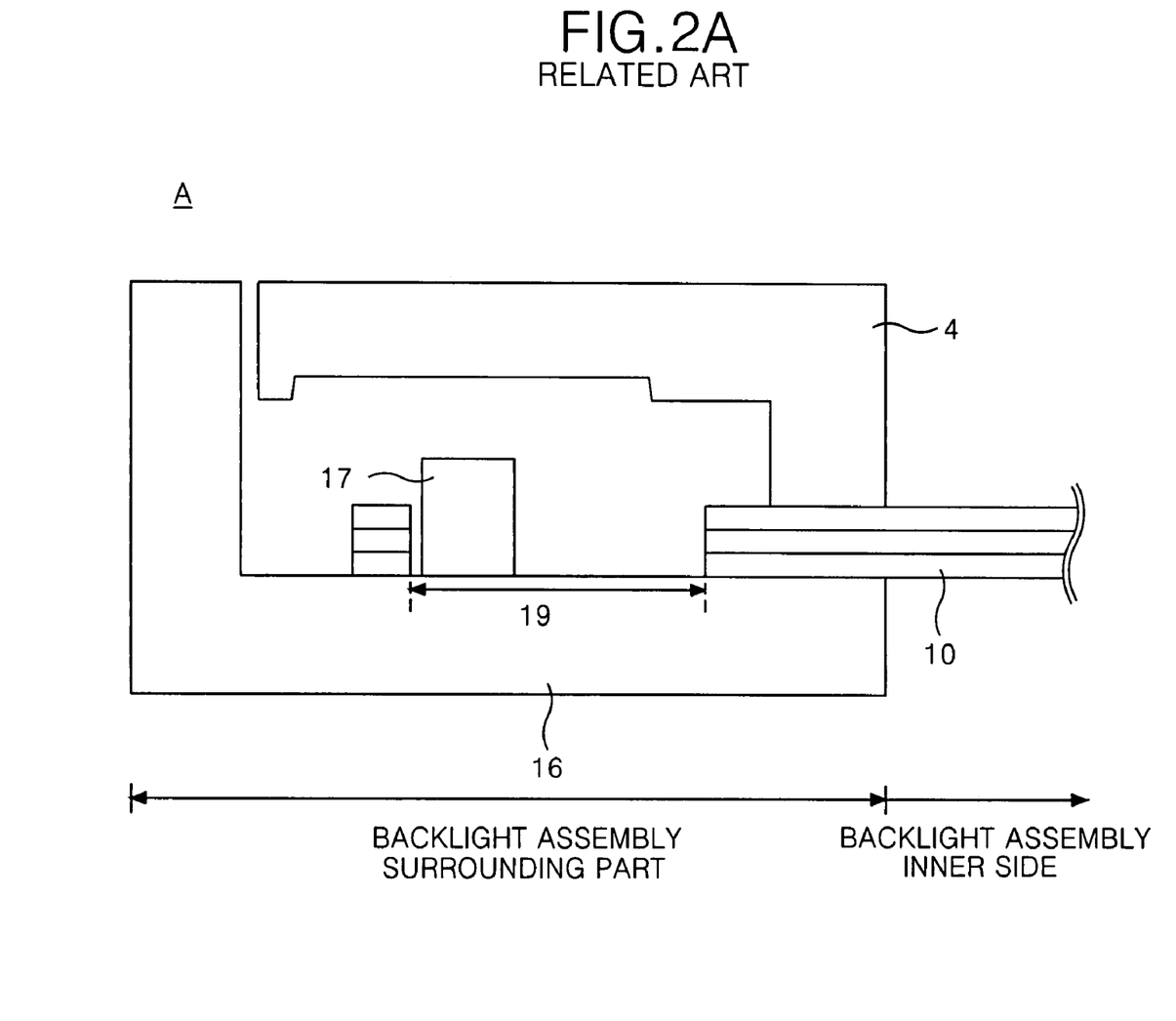
FIGS. 2A to 2B are diagrams representing a cross sectional view and a perspective plan view of a guide panel and a support main of the liquid crystal display device shown in FIG. 1.
Figure 2B:
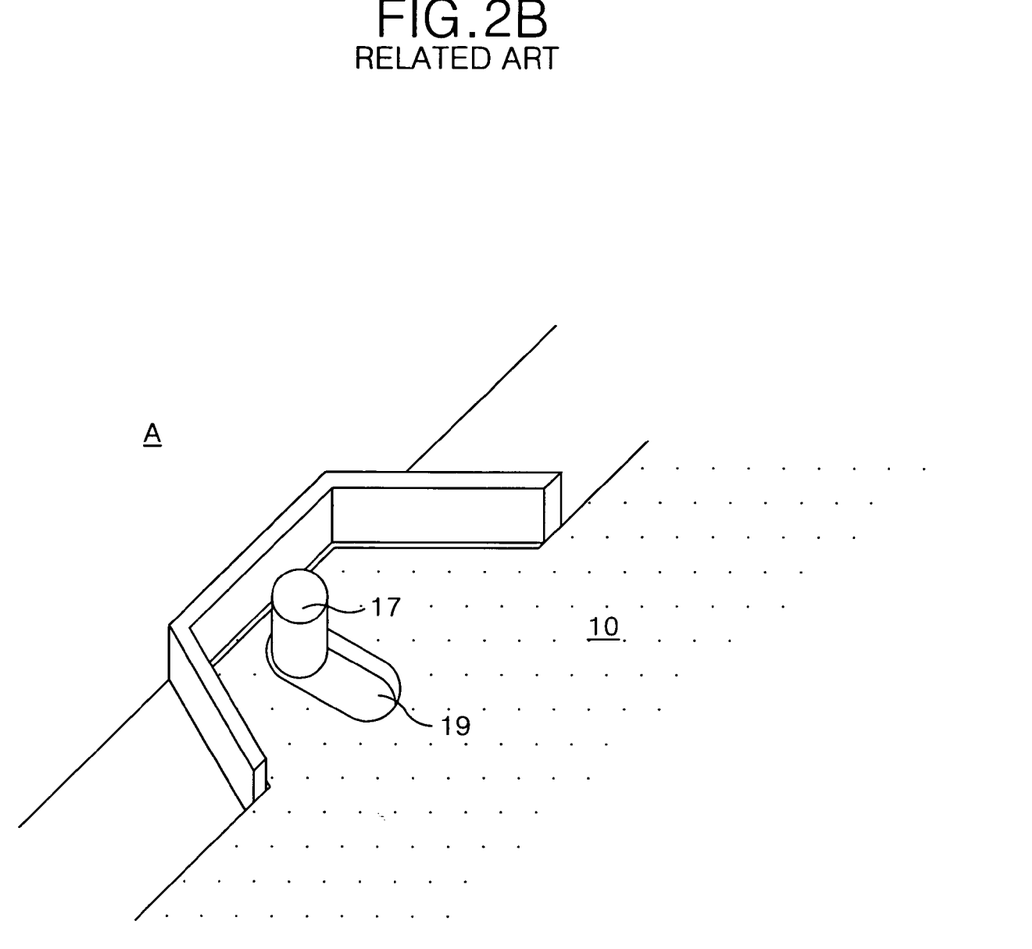

FIG. 2A is a diagram representing a cross section of a combining part (A) of the related art for joining the optical sheets 10 of the liquid crystal display module with the support side bottom 16. FIG. 2B is a perspective plan view of the combining part (A).

Referring to FIGS. 2A and 2B, there is formed a combining part (A) for joining the support main of the optical sheets 10 with the support side bottom 16 in one or both sides of the two side walls of the support side bottom 16. The structure of the combining part includes an opening 19 formed in the optical sheets 10 to join with a combining rod 17 formed in the support side bottom 16. The hole 19 of the optical sheets 10 is formed to have a side longer than the cylindrically shaped combining rod 17 formed in the support side bottom 16, so that the optical sheets 10 are not held in a fixed position on the support side bottom 16, but may move freely. The optical sheets 10 are allowed to move freely so that deformation to the optical sheets 10 resulting from heating or other physical effects does not generate wrinkles disturbing the flatness of the optical sheets 10. The flatness of the optical sheets 10 allows the optical sheets 10 to properly control the path of light.

In a structure where the optical sheets 10 are able to move freely, the individual optical sheets can rub against each other. Friction generated by the relative motion of individual optical sheets can result in the surface of the optical sheets being worn away and a prism on a prism sheet for controlling the path of light might be damaged. The damage of the prism on the prism sheet deteriorates brightness uniformity.

The above described problems can result in deterioration of a display quality of the liquid crystal display device.

SUMMARY OF THE INVENTION

Accordingly, the present invention is directed to a backlight unit and crystal display device using the same that substantially obviates one or more of the problems due to limitations and disadvantages of the related art.

An advantage of the present invention is to provide a backlight unit of a liquid crystal display device that is adaptive for preventing abrasion of surfaces of optical sheets caused because the optical sheets freely move and preventing deformation of the flat surface of the optical sheets.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit of a liquid crystal display device includes a light source; a reflecting sheet disposed in a rear surface of the light source; an optical sheet to direct light emitted from the light source to travel in a direction towards a liquid crystal display panel; and a cover bottom assembly formed to house the light source, the reflection sheet and the optical sheet, wherein the cover bottom assembly comprises support side bottoms formed at two short sides of the cover bottom assembly to dispose the optical sheet thereon, and the support side bottom includes a joining part to fix the optical sheet to the support side bottom using a movable body movable on a surface of the optical sheet.

In another aspect of the present invention a liquid crystal display device includes a backlight unit including a light source; a reflection sheet disposed in a rear surface of the light source; an optical sheet to direct light emitted from the light source incident towards a liquid crystal display panel; and a cover bottom assembly formed to house the light source, the reflection sheet, and the optical sheet, wherein the cover bottom assembly comprise support side bottoms formed at two short sides of the cover bottom assembly to dispose the optical sheet thereon, and the support side bottom includes a joining part to hold the optical sheet to the support side bottom using a movable body movable horizontally on the optical sheet; a liquid crystal display panel including an upper substrate having a color filter, a common electrode and a black matrix are formed thereon, a lower substrate on which data lines are formed to cross gate lines and a thin film transistor is formed at crossings of the data line and the gate line, and a liquid crystal formed in a space between the bonded upper and lower substrates; and a guide panel supporting the liquid crystal display panel to be joined with the support side bottom of the backlight unit.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Embodiments of the present invention will be described and explained with reference to FIGS. 3 to 5B.

Figure 3:
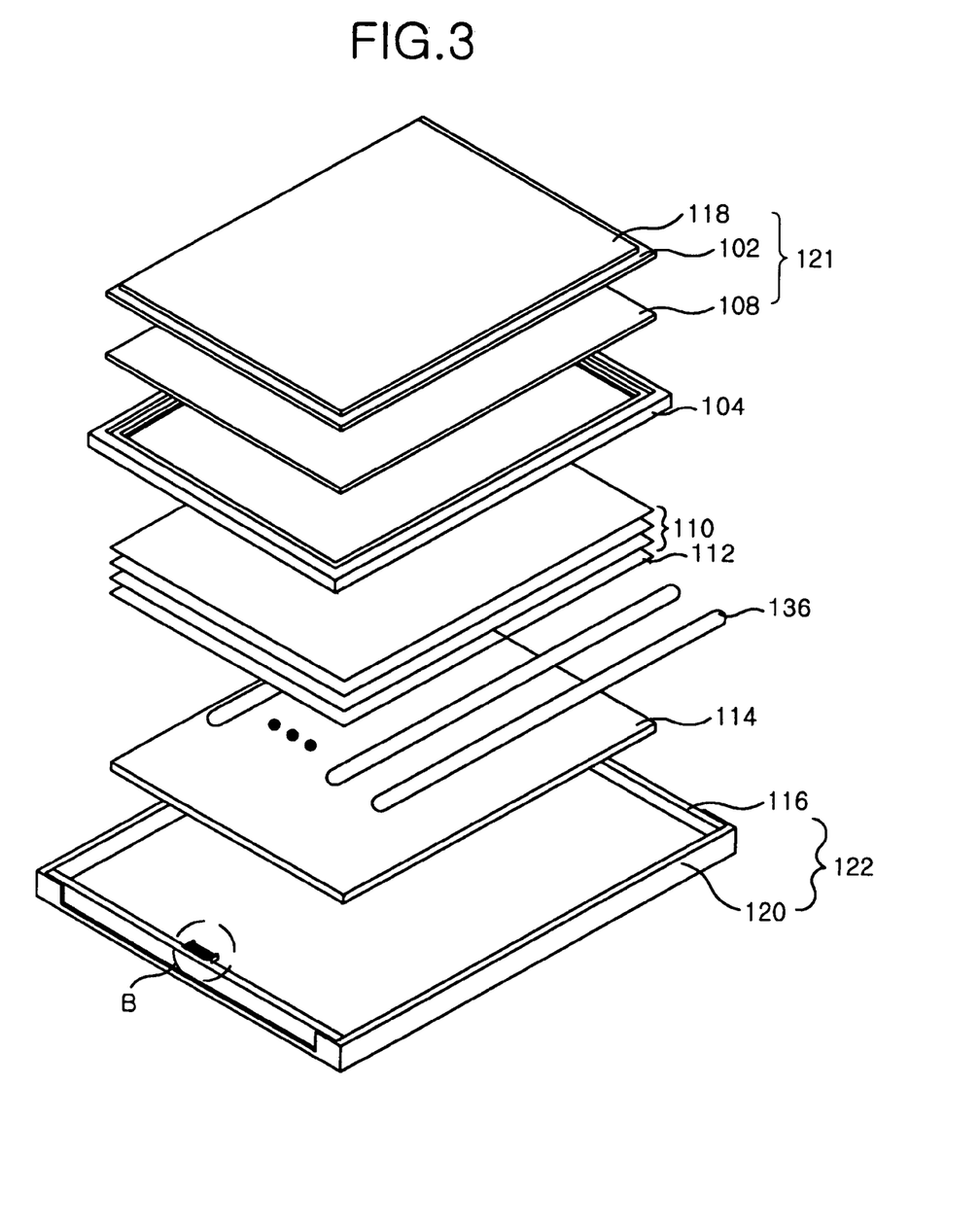
FIG. 3 is a diagram representing a liquid crystal display device according to a first embodiment of the present invention.

FIG. 3 is a diagram representing a liquid crystal display module according to a first embodiment of the present invention.

Referring to FIG. 3, the liquid crystal display module according to an embodiment of the present invention includes a board assembly 121 inclusive of a liquid crystal display panel 102 and polarizing sheets 108 and 118 formed on front and rear surfaces of the liquid crystal display panel 102; a backlight unit which receives power from an external power source to irradiate light onto the liquid crystal display panel 102; a guide panel 104 installed between the liquid crystal display panel 102 and the backlight unit to support the liquid crystal display panel 102 and to be joined with the side surface of a support side bottom 116.

The liquid crystal display panel 102 includes liquid crystal cells arranged in a matrix between upper and lower glass substrates and a thin film transistor (hereinafter, referred to as 'TFT') is installed at each liquid crystal cell for switching a data signal in each of the liquid crystal cells. A refractive index of each liquid crystal cell is changed according to a data signal to display a picture corresponding to the data signal. A tape carrier package (TCP) adheres to the lower substrate of the liquid crystal display panel 102. A driver integrated circuit for applying a drive signal to the thin film transistor is mounted on the TCP. Further, the polarizing sheets 108 and 118 are respectively installed on the front and rear surfaces of the liquid crystal display panel 102. The polarizing sheets 108 and 118 function to provide an improved viewing angle for images displayed by the liquid crystal cells.

The backlight unit includes a light source 136 that receives power from an external power source to emit light; a reflection sheet 114 disposed at the rear surface of the light source 136; a plurality of optical sheets 110 which increase the portion of the light emitted from the light source 136 that is directed to the liquid crystal display panel 102; and a cover bottom assembly 122 of a quadrangular shape to house the liquid crystal display panel, optical sheets.

The light source 136 includes a high voltage electrode and a low voltage electrode formed at respective ends of a glass tube; a high voltage wire soldered to the high voltage electrode; and a low voltage wire soldered to the low voltage electrode. The electrodes are each encompassed by a holder of an insulating material.

The reflection sheet 114 prevents loss of the light generated from the light source 136 by redirecting light towards the liquid crystal display panel 102;

The optical sheets 110 act to redirect light incident on the surface of the optical sheets 110 to travel towards the liquid crystal display panel 102.

The diffusion plate 112 evenly disperses the light from the light source over the surface of the panel liquid crystal display panel 102.

The inner side surface of an edge of the guide panel 104 is formed to have a safe receipt part for accepting the liquid crystal display panel 102 and a side wall to guide the side surface of the liquid crystal display panel 102.

The cover bottom assembly 122 includes a cover bottom 120 having side wall surfaces formed in two long sides thereof; and a supporter side bottom 116 having inclined side wall surfaces formed in two short sides thereof. Accordingly, the cover bottom assembly 122 has side walls formed in the four sides to house the liquid crystal display panel 102 and the backlight unit.

Figure 4A:
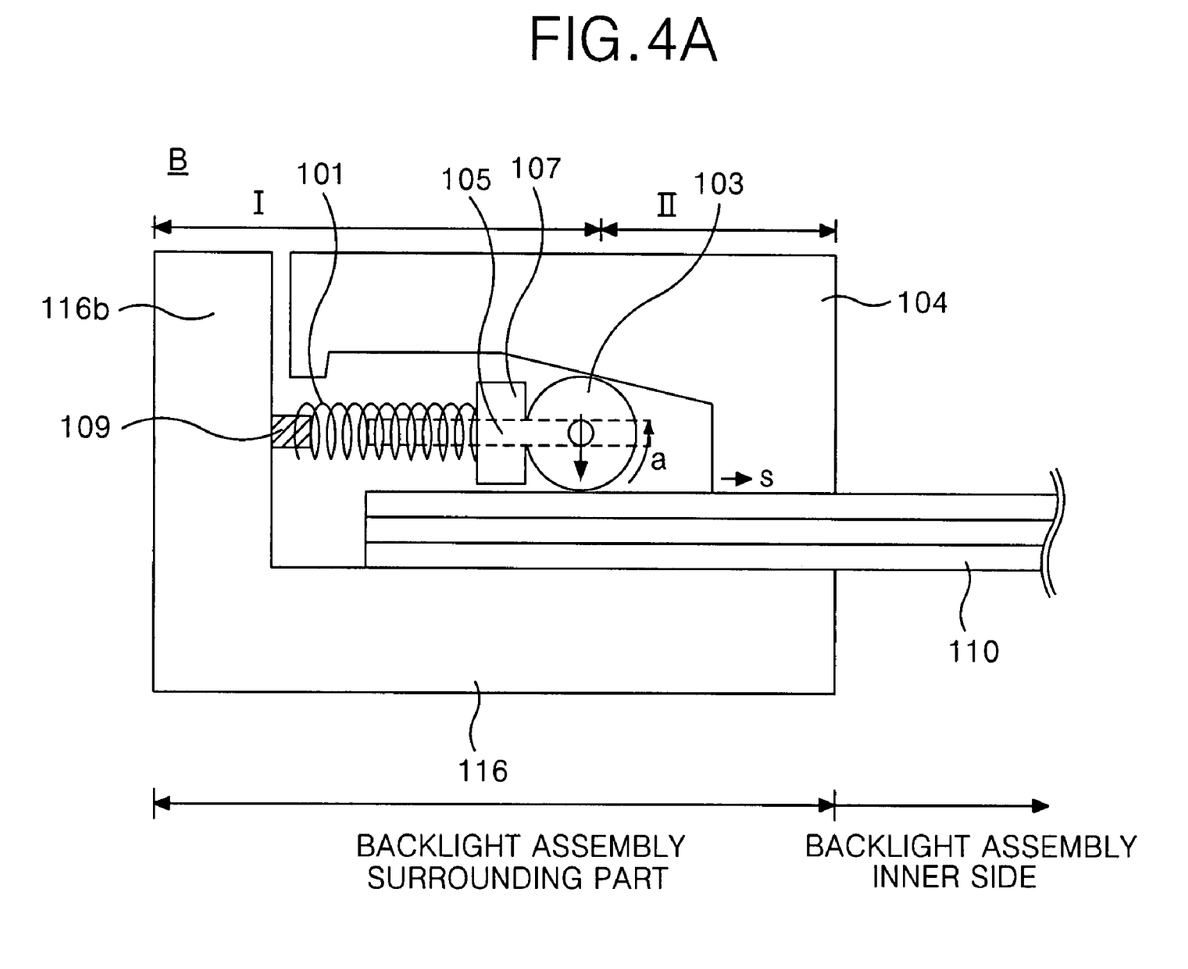
FIGS. 4A and 4B are diagrams representing a cross sectional view and a perspective plan view of an A area of the liquid crystal display device shown in FIG. 3.
Figure 4B:
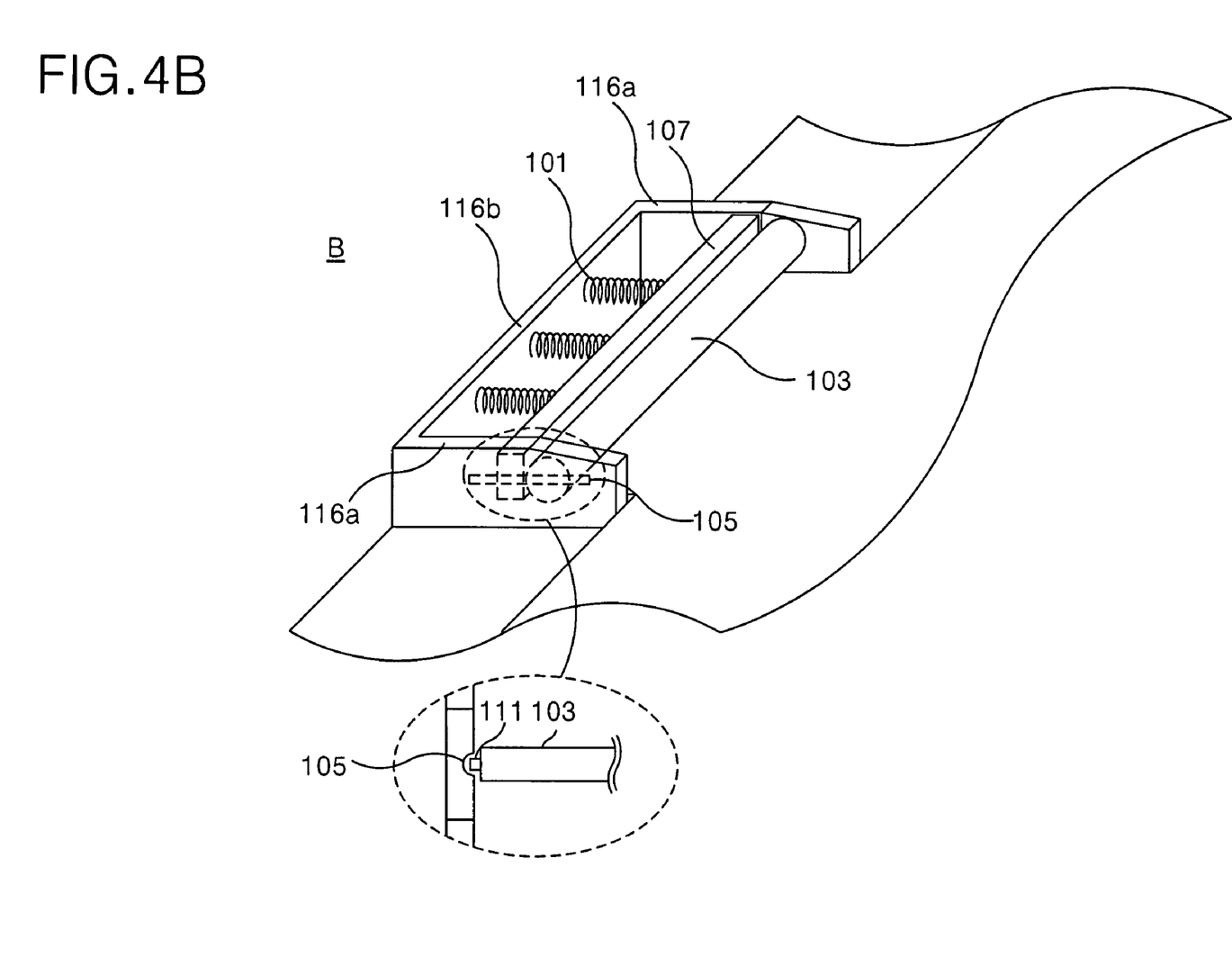

FIG. 4A is a diagram representing a cross section of a joining part (B) for securing the optical sheets 110 of the liquid crystal display module to the support side bottom 116. FIG. 4B is a perspective plan view of the joining part (B).

Referring to FIGS. 4A and 4B, in the liquid crystal display module according to the first embodiment of the present invention, the joining part of the support side bottom 116 for securing the optical sheets 110 includes two first projected parts 116a which face each other and second projected parts 116b connected to the ends of the two first projected parts. A slot or groove 105 providing a path through which a rotatable body 103 can move in a horizontal direction along a side wall is formed in each of the first protected parts 116a. The groove 105 is formed to accommodate a protrusion formed at the end of the rotatable body 103. A spring comprising an elastic body 101 is disposed on the second projected part 116b. A protrusion 109 on the second projected part 116b, maintains the position of the spring 101. One or more springs can be used, and in the example illustrated in FIG. 4B, three springs are used. A supporting member 107 of a cylindrical or polygonal prism shape is formed at the end of the spring. The supporting member 107 is constrained to move horizontally against the spring 101 in the direction s indicated by the arrow.

A cylindrically shaped pivot 111 projects from a central axis at the ends of the rotatable body 103. The supporting member 107 has a projected part projecting from the ends of the supporting member 107.

The pivot 111 of the rotatable body 103 and the projected part of the supporting member 107 are disposed to slide within the grooves 105 of the first projected parts 116a, constraining the rotatable body 103 and the supporting member 107 to move horizontally.

The guide panel 104 supports the liquid crystal display module and covers the support side bottom 116 at the edge of the liquid crystal display module. The cross section of the guide panel 104 includes an area I having a surface formed to be parallel to the edge of the liquid crystal display module and an area II having a surface inclined in the region near the rotatable body 103. The II area in the guide panel 104 starts from a location where the rotatable body 103 is located. The inclined surface of the guide panel 104 prevents the rotatable body 103 from moving horizontal beyond a fixed scope and holds the rotatable body 103 against the optical sheets 110.

The joining part according to the first embodiment of the present invention can maintain the position of the optical sheets 110 panel while preventing the generation of wrinkles generated by deforming of the optical sheets.

In particular, if a force tends to move the optical sheets 110 in an s-direction, the rotatable body 103 rotates in an a-direction motion due to a frictional force generated between the optical sheets 110 and the rotatable body 103. The horizontal movement of the rotatable body 103 is interrupted by the inclined surface of the guide panel 104 and the rotational motion of the rotatable body 103 is stopped by a frictional force with the guide panel surface to prevent the free motion of the optical sheets 110.

Further, the joining part according to the embodiment of the present invention allows an initial, but limited movement of the optical sheets 110 preserving the flatness of the optical sheets even if the optical sheets experience a deformation such as expansion or shrinkage of the optical sheets, thereby preventing deterioration of picture quality by preserving the ability of the optical sheets to perform their function.

Figure 5A:
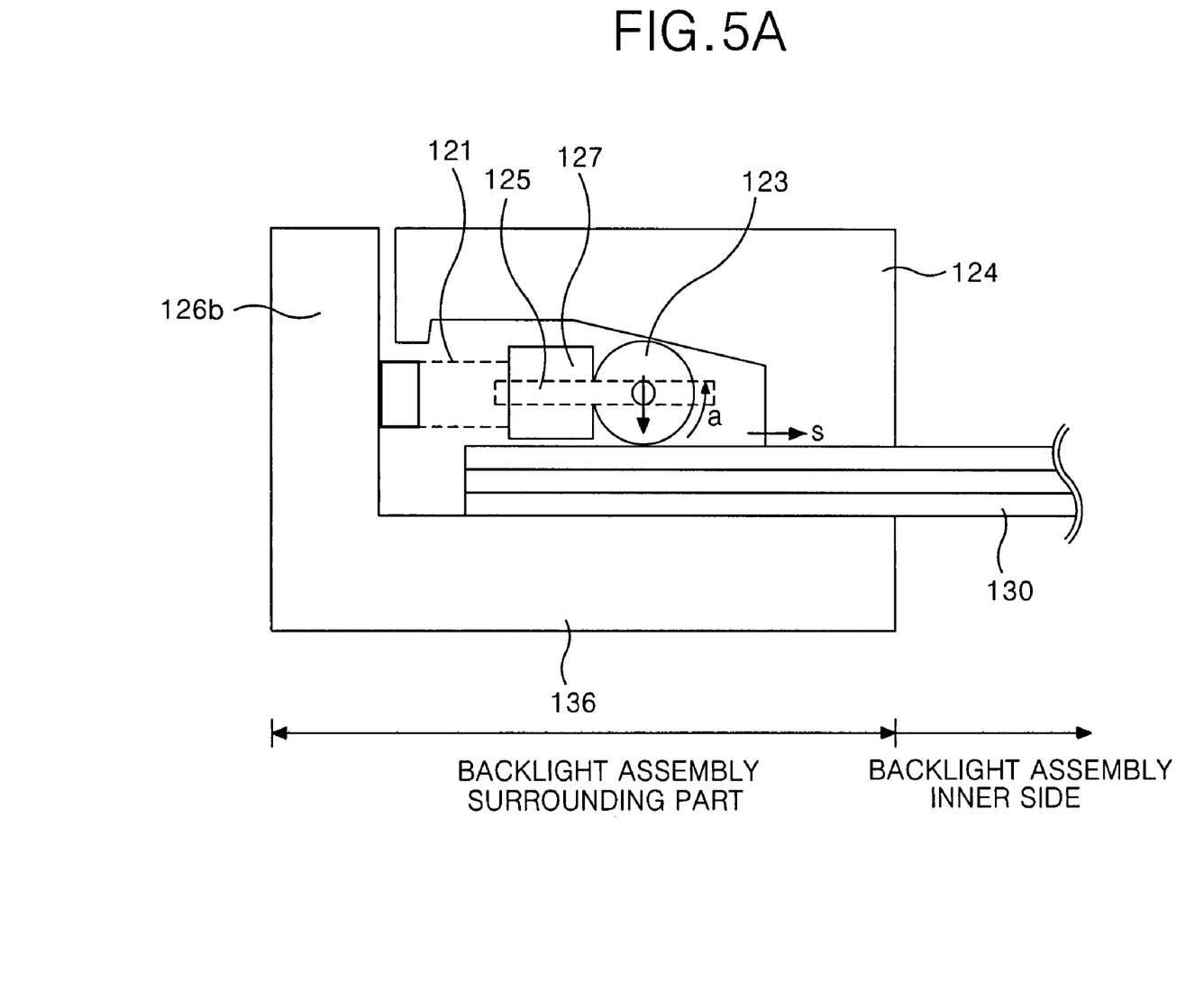
FIGS. 5A and 5B are a cross sectional view and a perspective plan view of an A area of a liquid crystal display device according to a second embodiment of the present invention.
Figure 5B:
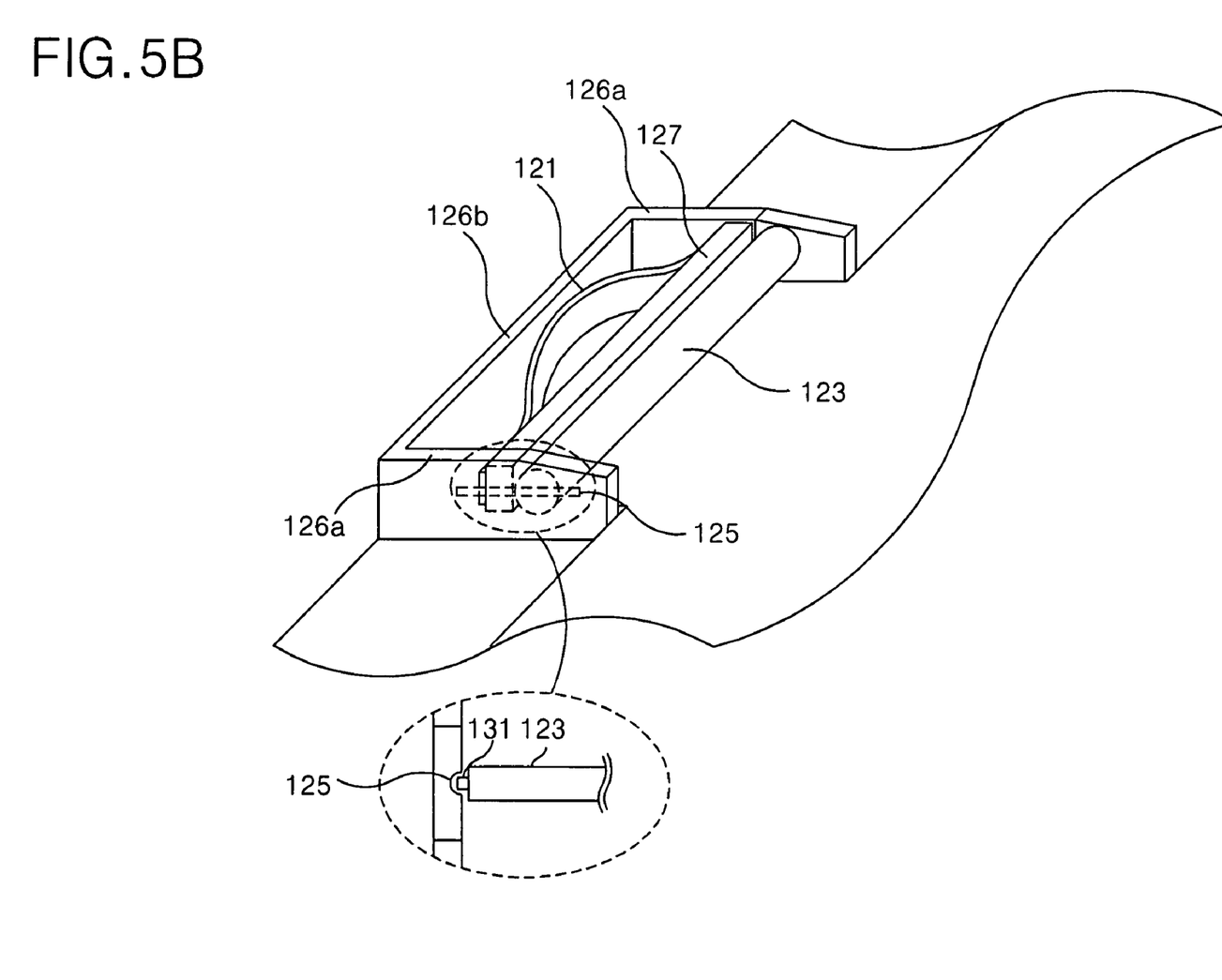

FIGS. 5A and 5B illustrate a joining part according to a second embodiment of the present invention.

Referring to FIGS. 5A and 5B, in a liquid crystal display module according to a second embodiment of the present invention, a joining part of a support side bottom 136 for combining the optical sheets 130 includes an elastic body 121 connected to a side wall 126b of the support main 136; and a rotatable body 123 movable in a horizontal movement direction against an elastic body 121. The elastic body 121 of the joining part according to the second embodiment of the present invention is a plate spring. The plate spring 121 is formed of a material having a relatively small the modulus of elasticity allowing the plate spring to be deformed with a little force. For example, a thin metal or plastic film can be used as the plate spring 121.

A supporting member 127 of a cylindrical or a polygonal prism shape is formed at the end of the plate spring. The supporting member 127 is constrained to move horizontally against the spring 121 in the direction s indicated by the arrow.

A pivot 131 is formed at each end of the rotatable body 123 at the center axis of the rotatable body. The pivot 131 may have a cylindrical prism shape. A pivot 131 is slidably disposed within each of the grooves 125 in the first projected parts 126a, thereby constraining the rotatable body 123 to move horizontally along with the supporting member 127. The rotatable body 123 is positioned closely against the optical sheet 130 so that as the rotatable body 123 moves horizontally in the direction s, the rotatable body 123 rotates in the a-direction due to the frictional force with the optical sheet 130.

The guide panel 124 supports the module in and is shaped to cover the support side bottom 136 at the edge of the module. The cross section of the guide panel 124 includes an area having a surface parallel to the edge of the module and an area II having an inclined surface in region near the rotatable body 123 of the joining part. In the guide panel 124, the II area is formed in an area in which the rotatable body 123 is located. The inclined surface of the guide panel 124 prevents the rotatable body 123 from moving horizontally beyond a fixed scope and provides a force pushing the rotatable body 123 against the optical sheets 130.

In the joining part between the optical sheets 130 and the support main 136 according to the second embodiment of the present invention, the principle of operation of the rotatable body 123 to restrict free movement of the optical sheets 130 is the same as described in the first embodiment and a detailed description will be omitted.

In the illustrated embodiments, elasticity is provided by an elastic body such as a coiled spring or a plate spring. The elasticity can be realized in forms other than a coiled spring or a plate spring, and various elastic materials such as elastic rubber or resilient plastic materials can be used.

Further, the rotatable body can be formed to have a spherical shape rather than the cylindrical shape. When a spherical rotatable body is employed, the optical sheets and the rotatable body contact at a point, so that there is a difference in the frictional force and the supporting force for the rotatable body. Multiple spherical rotatable bodies can be used with the number of rotatable bodies selected based on the size of the module.

As described above, the backlight unit of the liquid crystal display device according to the present invention can prevent abrasion between the optical sheets by limiting free movement of the optical sheet while also preventing the deterioration of the display quality caused by loss of flatness of the optical sheets due to deformation.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit of a liquid crystal display device, comprising:
    a light source;
    a reflective sheet disposed near a rear surface of the light source;
    an optical sheet to direct light emitted from the light source to travel in a direction towards a liquid crystal display panel; and
    a cover bottom assembly formed to house the light source, the reflection sheet and the optical sheet,
    wherein the cover bottom assembly comprises support side bottoms formed at two short sides of the cover bottom assembly to dispose the optical sheet thereon, and the support side bottom includes a joining part to fix the optical sheet to the support side bottom using a movable body movable on a surface of the optical sheet,
    wherein the joining part includes two first projected parts projected from the support side bottom, the projected parts arranged to face each other and a second projected part connected between the ends of the two first projected parts.

2. The backlight unit according to claim 1, wherein the joining part includes:
    an elastic body of which one side is fixed to the second projected part;
    a supporting member formed on the other side of the elastic body movable horizontally to compress the elastic body; and
    a rotatable body movable horizontally together with the supporting member to hold the optical sheet.

3. The backlight unit according to claim 2, wherein the rotatable body is cylindrical.

4. The backlight unit according to claim 2, wherein the rotatable body is formed of a plurality of spheres connected with one pivot.

5. The backlight unit according to claim 4, wherein the pivot engages a groove at formed at each of the two projected parts to constrain the elastic body to move horizontally.

6. The backlight unit according to claim 2, wherein the elastic body is a plate spring.

7. The backlight unit according to claim 2, wherein the elastic body is a spring.

8. The backlight unit according to claim 2, wherein the second projected part and the two first projected parts facing each other are formed in a '[' shape.

9. The backlight unit according to claim 8, wherein the supporting member and the rotatable body are movable horizontally between the two first projected parts of the '[' shape.

10. The backlight unit according to claim 2, wherein a moving distance of the rotatable body is limited by an inclined surface of a guide panel covering the support side bottom.

11. The backlight unit according to claim 10, wherein the rotatable body is arranged to be rotated by a free movement of the optical sheet, the movement and rotation of the rotatable body to be limited by the inclined surface of the guide panel to prevent an additional free movement of the optical sheet.

12. The backlight unit according to claim 2, wherein the rotatable body I arranged to be rotated by a free movement of the optical sheet.

13. A liquid crystal display device, comprising:
    a backlight unit including a light source; a reflective sheet disposed at a rear surface of the light source; an optical sheet to direct light emitted from the light source towards a liquid crystal display panel; and a cover bottom assembly formed to house the light source, the reflection sheet, and the optical sheet, wherein the cover bottom assembly comprise support side bottoms formed at two short sides of the cover bottom assembly to dispose the optical sheet thereon, and the support side bottom includes a joining part to hold the optical sheet to the support side bottom using a movable body movable horizontally on the optical sheet;
    a liquid crystal display panel including an upper substrate having a color filter, a common electrode and a black matrix are formed thereon, a lower substrate on which data lines are formed to cross gate lines and a thin film transistor is formed at crossings of the data line and the gate line, and a liquid crystal formed in a space between the bonded upper and lower substrates; and
    a guide panel supporting the liquid crystal display panel to be joined with the support side bottom of the backlight unit,
    wherein the joining part includes two first projected parts projected from the support side bottom, the projected parts arranged to face each other and a second projected part connected between the ends of the two first projected parts.

14. The liquid crystal display device according to claim 13, wherein the joining part of the backlight unit includes:
    an elastic body of which one side is fixed to the second projected part;
    a supporting member formed on the other side of the elastic body movable horizontally to compress the elastic body; and
    a rotatable body movable horizontally together with the supporting member to hold the optical sheet.

15. The liquid crystal display device according to claim 14, wherein the elastic body is a plate spring.

16. The liquid crystal display device according to claim 14, wherein the elastic body is a spring.

17. The liquid crystal display device according to claim 14, wherein a moving distance of the rotatable body is limited by an inclined surface of the guide panel covering the support side bottom.

18. The liquid crystal display device according to claim 17, wherein the rotatable body is arranged to be rotated and moved by a free movement of the optical sheet, the movement and rotation of the rotatable body limited by an inclined part of the guide panel to prevent an additional free movement of the optical sheet.

19. The liquid crystal display device according to claim 14, wherein the rotatable body is cylindrical.

20. The liquid crystal display device according to claim 14, wherein the rotatable body is composed of a plurality of spheres connected to one pivot.

* * * * *